United States Patent Office 3,049,548
Patented Aug. 14, 1962

3,049,548
CERTAIN ALPHA-HYDRAZINO-IMIDAZOLE-PROPIONIC ACID DERIVATIVES
Meyer Sletzinger, North Plainfield, N.J., assignor to Merck & Co., Inc., Rahway, N.J., a corporation of New Jersey
No Drawing. Filed Jan. 23, 1961, Ser. No. 83,885
9 Claims. (Cl. 260—309)

This invention relates to new hydrazino acids. More specifically, this invention relates to α-hydrazino-β-4-(or 5-)imidazolylpropionic acids and their lower alkyl esters and the non-toxic salts thereof. Such compounds can be illustrated by the formula—

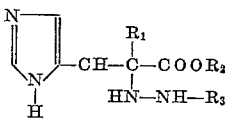

in which $R_1$ and $R_2$ may be hydrogen or lower alkyl, and $R_3$ may be lower alkanoyl or hydrogen. This formula shows the side chain in the 5-position. A shift of the proton to the other nitrogen, which may happen readily, transforms it into a 4-imidazolyl compound. Essentially because the shift is easy, the isomers are equivalent and for convenience the above structure is used throughout this specification.

The knowledge that histamine or a histamine-like substance is released in tissues in allergic reactions has led to the development of compounds that are histamine antagonists. These drugs, when given orally, subcutaneously, intraperitoneally or intravenously to a guinea pig, prevent histamine shock and bronchospasm from aerosolized histamine. They further inhibit histamine whealing on human skin and prevent histamine asthma in man. Some actions, however, of histamine, such as the stimulation of salivation and gastric secretion, are not inhibited by antihistaminic drugs.

I have found a new class of antihistaminically-active compounds whose apparent mode of action is different from that heretofore known to the art. I have found that α-hydrazino imidazolylpropionic acids and their esters and amides are strong antihistaminics, apparently with a different mode of action than those heretofore known. This mode of action is believed to be the blocking of histamine formation by the inhibition of histidine decarboxylase. These compounds, thus, are antimetabolites instead of being antagonists, as are the known antihistaminics.

The compounds of my invention are further useful as intermediates in the preparation of imidazolylethyl hydrazines, a class of compounds resembling histamine in structure and products derivable therefrom. Such hydrazines are prepared by decarboxylating the compounds of my invention enzymatically, using e.g., mammalian decarboxylase, obtainable by the evaporation of the aqueous extract of ground beef or hog kidney or liver. The hydrazino acid is heated at 37° C. with the enzyme and the co-enzyme pyridoxal phosphate in an aqueous medium, buffered at a pH of 6.8, to give the corresponding hydrazine. Further condensation of these hydrazines with acylacetic esters in the manner usually used with phenylhydrazine and alkylation of the pyrazolone product will yield compounds resembling in structure the antipyrine type of analgesic and antineuralgic. When the hydrazino acids of my invention are used in the reaction with acylacetic esters, similar pyrazolones having free carboxyl groups are obtained. These, on alkylation, also resemble the structure of antipyrine.

The hydrazino acids of my invention are also useful in their own right in the separation of ketonic products from non-ketonic material, in a manner similar to that in which Girard's reagent is used (Girard et al., Helv. chim. Acta 19, 1095 (1936); see also Fieser Steroids, Reinhold, N.Y., 1959, pages 449 and 606). Being hydrazines, they can be reacted with a carbonyl compound to form a hydrazone. Since they also have carboxylic acid groups, the resulting hydrazones can be dissolved in aqueous alkali and the carbonyl compounds regenerated with acid. They thus are in contrast with Girard's reagent which is a quaternary ammonium substituted hydrazine.

The compounds of my invention are prepared by the series of reactions shown schematically in Chemical Flow Sheet I.

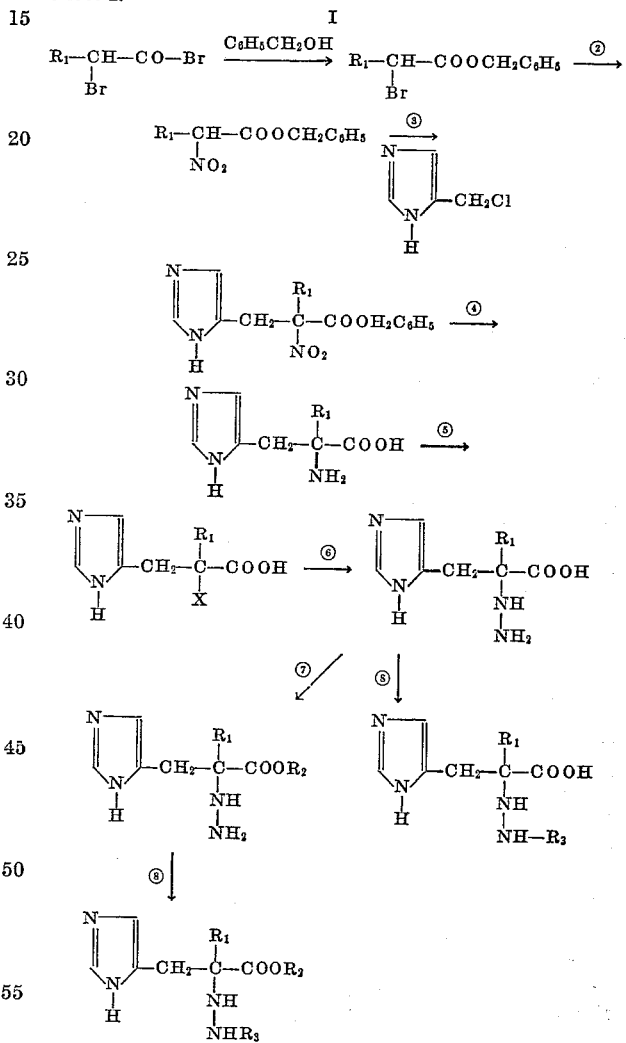

Definitions:
  $R_1$ = H or lower alkyl
  $R_2$ = H or lower alkyl
  $R_3$ = H or lower alkanoyl
  X = Cl or Br
Reagents:
  (1) Pyridine and toluene, reflux
  (2) $NaNO_2$, phloroglucinol, dimethylformamide
  (3) Sodium hydride in DMF
  (4) Hydrogen, Raney nickel, then HCl
  (5) HX and $NaNO_2$
  (6) Hydrazine
  (7) $R_2OH$ plus HCl
  (8) Alkanoic anhydride When $R_1$ is hydrogen, the starting material is histidine. When $R_1$ is alkyl the α-alkyl histidine is prepared as shown. An α-bromoalkanoyl bromide is converted to an ester and the α-bromo is then replaced by a nitro group. The nitro ester is then condensed with chloromethylimidazole and the nitro group is reduced. Saponification of the ester then gives α-alkyl histidines. Normally, the benzyl ester is used in this synthesis because it is easily cleaved, and this is what is shown in Table I. However, any other aliphatic ester can eqaully well be used. The nature of the esterifying group is unimportant when the free acid is desired other than with respect to the ease of cleavage. When an ester of the α-alkyl histidines is desired, it can be prepared from the free acid by reesterification with a lower alkanol or it can be prepared directly by using the proper nitro ester in the condensation with the chloromethylimidazole. The histidine, whether or not it has an α-alkyl group, is converted to the hydrazino acid by replacing the amino group by chlorine using the method of Gerngross (Ber. 42, 404 (1909), or Edlbacher et al. (Z. physiol. Ch. 276, 126 (1942), followed by reaction of the α-chloroacid with hydrazine.

The compounds of my invention include α-hydrazino-β-4-imidazolyl propionic acid, its α-methyl, ethyl, propyl and butyl derivatives, the formyl, acetyl, propionyl, etc. derivatives of any of these, and the methyl, ethyl, propyl, butyl, etc. esters of any of these acids.

The esters of the hydrazino acid are readily prepared from the free acids by esterification with a lower alkanol in the presence of a catalytic amount of sulfuric acid, hydrochloric acid, hydrobromic acid and the like. More conveniently, they are prepared directly in the synthesis.

The hydrazides are prepared by acylation of the hydrazino acids with a lower alkanoic chloride or anhydride such as acetic anhydride, propionic anhydride or butyric anhydride or acetyl, propionyl or butyryl chloride. Formyl groups are introduced using formyl acetic anhydride (Huffmann, J. Org. Chem. 23, 728 (1958), describes the preparation of this reagent).

The esters and hydrazides are especially useful in that one obtains much better absorption of the compound in the body and much more prolonged activity with smaller and less frequent dosage. The esters, especially can be used in the form of non-toxic salts such as the hydrobromide, hydrochloride, sulfate and the like. These salts are water soluble and are formed in the presence of the ester. If the free amino ester is desired, it is obtained by basification of the salt formed during the preparation. It, too, can be used therapeutically.

In their use as antihistominics, the compounds of my invention are used in humans in dosages ranging from 0.5 to 25.0 g. per day, usually orally. In animals, dosages range from 10 to 350 mg. per kg. weight. Preferably, they are used in the range of 2–10 g. per day, usually in frequent small dosages, probably not more than a couple of hours apart. More or less frequent and larger and smaller unit dosages are, of course, also possible. These compounds can be mixed with any of the conventional ingredients for tablets. The compounds can also be applied parenterally in standard pharmaceutical carriers for such application.

My invention can be illustrated by the following examples. The first five examples illustrate the preparation of α-alkyl substituted starting materials.

Example 1

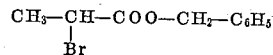

To a mixture of 42.8 g. of benzyl alcohol, 21.8 g. of pyridine and 225 cc. of toluene, there is added with vigorous stirring, 60 g. of α-bromo propionyl bromide, dropwise, over 30 minutes while keeping the temperature of the mixture at 20–25° C. The mixture is then heated to reflux for 4 hours, with good agitation. The reaction mixture is cooled to 15–20° C. and 100 ml. of water is added. The toluene layer is separated and the aqueous layer is extracted with 50 cc. of toluene. The combined solutions are then washed with water until neutral and dried over anhydrous sodium sulfate. The dry toluene solution is then concentrated in vacuo and the residual material is distilled. The material which has a boiling point of 86.89° and 0.1 mm. is collected. This is the benzyl α-bromopropionate.

When, in the above procedure, equivalent quantities of α-bromobutyrylbromide, α-bromovaleryl bromide, α-bromocaproylbromide and α-bromoheptoylbromide are used in place of the α-bromopropionylbromide, the corresponding benzyl α-bromo esters are obtained.

The corresponding ethyl α-bromopropionate and the ethyl esters of the other acids are obtained when an equivalent quantity of ethyl alcohol is used in place of the benzyl alcohol in the above procedure.

Example 2

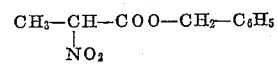

To a well-stirred slurry of 37.3 g. of sodium nitrite 42 g. of anhydrous phloroglucinol in 625 ml. of dimethylformamide, there is added over 3–5 minutes at 25° C. 76 g. of the product of Example 1. The mixture is stirred at 25° C. for 18 hours, then poured into 1600 ml. of ice water and 300 ml. of ether, with good agitation. The ether layer is separated and the aqueous layer is extracted three times with 300 ml. of ether. The combined ether layers are washed five times with 300 ml. of water and then dried over magnesium sulfate. The dry extract is concentrated and the residual oil is fractionated through a packed column. The α-nitro ester is obtained at a boiling range of 125–126° C. at 1.5 mm.

Similarly, when the corresponding α-bromobutyryl ester, α-bromovaleryl ester, α-bromocaproyl and β-heptoyl ester are substituted in equivalent quantities for the α-nitropropionyl ester, the corresponding α-nitro esters are obtained.

When the corresponding ethyl ester of any of the above bromo acids is used in place of the benzyl ester, in equivalent quantity, in the above procedure, the ethyl α-nitro esters are obtained.

Example 3

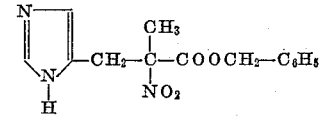

A mixture of 12.8 g. of sodium hydride and 540 cc. of dimethyl formamide is stirred vigorously for 30 minutes at 25° C. and then cooled to 10° C. To this mixture is added 28.8 g. of the nitro ester produced in Example 2. The reaction is stirred at room temperature for 5 hours and then rechilled to 5° C. To this slurry is added, over 3–5 minutes, a solution of 21 g. of chloromethylimidazole (prepared by the procedure in Organic Syntheses, vol. 24, page 64) in 210 cc. of dimethyl formamide. The reaction mixture is stirred for 18 hours at 25° C. and then cooled to 5° C. While the temperature of the mixture is held below 20° C. by cooling, 5 cc. of cold water is added. The reaction mixture is then diluted with an additional 3 liters of water and the product is extracted with 3 portions of ether. The combined ether extracts are then washed five times with a liter of water in order to remove dimethyl formamide, and dried over anhydrous magnesium sulfate. The dried extract is concentrated until crystallization begins and then cooled at 0°. The α-nitro-α-methyl-β-5-imidazolyl propionic ester is isolated by filtration, washed with ether and dried.

When, in the above procedure, an equivalent quantity of the α-nitrobutyryl, α-nitrovaleryl, α-nitrocaproyl or α-nitroheptoyl ester prepared in Example 2 is substituted for the α-nitro propionate, the corresponding α-alkyl-β-imidazolyl ester is obtained.

When, in the above procedure, the corresponding ethyl α-nitro ester is used in equivalent quantity in place of the benzyl ester, the corresponding ethyl α-nitro-α-alkyl-imidazolyl alkanoate is obtained. Similarly, the other lower alkyl esters of these alkanoates are obtained by the starting Example 1 with the corresponding alkanol instead of ethanol or benzyl alcohol, and following the procedure of Examples 1 and 2 and then the above procedure.

Example 4

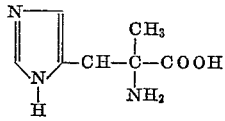

A pressure bomb is charged with a mixture of 5.35 g. of the α-nitro-α-methyl-β-imidazolyl propionic acid benzyl ester, prepared in Example 3, 250 ml. of methanol and one teaspoon of Raney nickel. The bomb is purged with an excess of hydrogen and then sealed and agitated until the absorption of hydrogen has ceased. The reaction mixture is then filtered to remove the catalyst and the filtrate is acidified to a pH of 2 with a solution of hydrogen chloride in methanol. The solution is concentrated in vacuo to dryness keeping the temperature below 40° C. The α-amino ester residue is then mixed with 75 cc. of concentrated hydrochloric acid and the mixture is refluxed for 18 hours. The mixture is then cooled to 25° C. and extracted five times with 50 ml. of ether. The aqueous solution is concentrated in a vacuum to a volume of 15 cc. and the pH is adjusted to 5-6, with ammonium hydroxide. Upon the addition of 300 ml. of acetone to this solution, and standing, a white crystalline precipitate of the α-methyl histidine separated. This is isolated by filtration and washed with acetone.

When the ethyl and lower alkanol esters of the α-nitro-α-methyl propionic acid are used in equivalent quantity in place of the benzyl ester, in the above procedure, the corresponding lower alkyl esters of α-methyl histidine are obtained as the hydrochloride after the evaporation to dryness of the alcoholic reaction filtrate.

Example 5

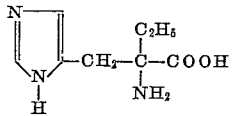

The procedure of Example 4 is followed using an equivalent quantity of the benzyl α-nitro-α-ethyl-β-5-imidazolyl propionate prepared in Example 3. Similarly, when the corresponding α-propyl, α-butyl and α-amyl esters are substituted in equivalent quantities for the α-methyl ester, the corresponding α-alkyl histidine is obtained.

When the ethyl and other lower alkanol esthers of the α-nitro and α-alkyl propionic acids are used in place of the benzyl ester, in equivalent amounts, as in Example 4, the corresponding lower alkyl esters of the α-alkyl histidine are obtained as the hydrochloride.

Example 6

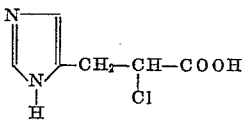

The α-chloro-β-imidazolyl propionic acid is prepared by the method of Edlbacher and Bidder (Z. physiol. Ch. 276, 126 (1942), as follows: To a solution of 100 g. of histidine in 750 ml. of concentrated HCl is added slowly, while keeping the temperature at 5-10° C., a solution of 100 g. of sodium nitrite in 200 ml. of water. The mixture is stirred while cooling in an ice bath until the temperature is 0° C. The red brown mixture is filtered through a glass filter to remove sodium chloride and the precipitate is washed with cold concentrated HCl. The filtrate and washings are evaporated in vacuo below 50° C. to a thick syrup. This is dissolved in 200-300 ml. of water at 45-50° C. The evaporation and redissolution is repeated several times to remove excess HCl. Thereupon, the syrup is dissolved in a minimum amount of warm water. The solution is cooled and neutralized with ammonia. The solution is then evaporated to dryness and the crystalline mass is recrystallized from hot water. The product is dried.

When α-methylhistidine, α-ethylhistidine, α-propylhistidine or α-butylhistidine is used in equivalent quantities in place of histidine, in the above procedure, there is obtained α-methyl-α-chloro-β-5-imidazolyl-propionic acid, α-ethyl-α-chloro-β-5-imidazolylpropionic acid, α-propyl-α-chloro-β-5-imidazolylpropionic acid or α-butyl-α-chloro-β-5-imidazolylpropionic acid.

Example 7

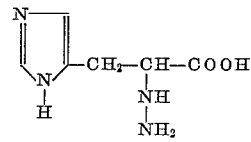

α-Chloro-β-5-imidazolylpropionic acid, prepared in Example 6, is mixed with a large excess of hydrazine hydrate. The mixture is stirred and the chloride ion liberated is titrated in aliquots from time to time until the reaction is indicated to be substantially complete. The reaction mixture is then concentrated in vacuo and the residue is dissolved in water. The solution is evaporated in vacuo to dryness and the residue is stored over $P_2O_5$ to remove last traces of hydrazine. The residue is then redissolved in water. The solution is passed through a column containing Amberlite IR-120 (Rohm & Haas). The column is then eluted with aqueous ammonia to remove the α-hydrazino acid. The solution is then concentrated to a syrup and added dropwise to absolute alcohol. The crude α-hydrazino-β-5-imidazolylpropionic acid obtained can be recrystallized from a small amount of hot water.

When the corresponding α-methyl, ethyl, propyl and butyl-α-chloro acids prepared in Example 6 are used in the above procedure, there are obtained the corresponding α-hydrazino acids, namely, α-hydrazino-α-methyl, ethyl, propyl and butyl-β-5-imidazolyl-propionic acids.

Example 8

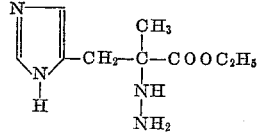

300 ml. of absolute ethanol are saturated by dry hydrogen chloride at 0° and 7 g. of α-hydrazino-β-5-imidazolylpropionic acid is added. The reaction mixture is refluxed for 5 hours and then allowed to stand one day at room temperature. The solvent is removed in vacuo and the residue is dissolved in 30 ml. of ethanol. The solution is diluted with 30 ml. of anhydrous ethyl acetate and the dihydrochloride of the ethyl ester of α-hydrazino-α-methyl-β-5-imidazolylpropionic acid is precipitated by slow addition of anhydrous ether. The product is isolated by filtration, washed with ether and dried.

When the α-alkyl hydrazino acids described in Example 6 are substituted in equivalent quantities for the hydrazino acid in the above procedure, the corresponding ester is obtained.

When, in the above procedure, anhydrous methanol, propanol or butanol are substituted for the ethanol (and the time of refluxing is extended several-fold in the case of the higher alcohols), the corresponding methyl, propyl or butyl ester is obtained.

The free hydrazines are obtained from these hydrochlorides by basification of their aqueous solution with sodium carbonate.

*Example 9*

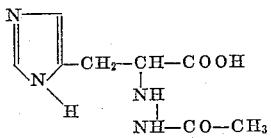

A mixture of 25 g. of α-hydrazino-β-5-imidazolylpropionic acid, 100 ml. of acetic anhydride and 75 ml. of pyridine is purged thoroughly with nitrogen. It is then heated to 90° until acylation is substantially complete. The mixture is cooled gradually to room temperature and concentrated on a steam bath in vacuo. The residue is stirred with ice water and made strongly acidic with 2.5 N-hydrochloric acid. The precipitated crystalline α-N-acetylhydrazino-β-5-imidazolylpropionic acid hydrochloride salt is isolated by filtration, washed thoroughly with ice water and dried over $P_2O_5$ in vacuo. The product may include some α-N′-acetylhydrazino-β-5-(1-acetylimidazolyl)propionic acid.

When propionic anhydride, butyric anhydride or formyl acetic anhydride are used in the above procedure in place of the acetic anhydride, the corresponding propionyl, butylryl, and formyl products are obtained.

When the α-alkyl hydrazino acids prepared in Example 7 are used in equivalent quantities in place of the above hydrazino acid, the corresponding α-methyl, ethyl, propyl and butyl hydrazino acid hydrochloride salts are obtained.

I claim:

1. A compound selected from the group consisting of (1) compounds of the formula—

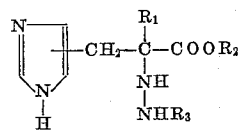

in which $R_1$ and $R_2$ are selected from the group consisting of hydrogen and lower alkyl, and $R_3$ is selected from the group consisting of hydrogen and lower alkanoyl, the side chain being attached to one of the two vicinal ring carbons and (2) non-toxic salts of compounds of the group defined in (1).

2. α-Hydrazino-β-5-imidazolyl propionic acid.

3. α-Hydrazino-β-5-imidazolyl propionic acid ethyl ester.

4. α-Hydrazino-β-5-imidazolyl propionic acid ethyl ester hydrochloride.

5. α-Hydrazino-α-methyl-β-5-imidazolyl propionic acid.

6. α-Hydrazino-α-mehyl-β-5-imidazolyl propionic acid ethyl ester.

7. α-Hydrazino-α-methyl-β-5-imidazolyl propionic acid ethyl ester hydrochloride.

8. α-Acethylhydrazino-β-5-imidazolyl propionic acid.

9. α-Acetylhydrazino-α-methyl-β-5-imidazolyl propionic acid.

References Cited in the file of this patent

UNITED STATES PATENTS 2,955,108    Omietanski _____ Oct. 4, 1960